(12) United States Patent
de Versterre

(10) Patent No.: US 8,205,593 B2
(45) Date of Patent: Jun. 26, 2012

(54) DEV CYCLE ENGINE

(76) Inventor: William I. de Versterre, Warren, NJ (US)

( * ) Notice: Subject to any disclaimer, the term of this patent is extended or adjusted under 35 U.S.C. 154(b) by 0 days.

(21) Appl. No.: 12/456,490

(22) Filed: Jun. 17, 2009

(65) Prior Publication Data

US 2011/0036324 A1  Feb. 17, 2011

(51) Int. Cl.
F02B 19/10 (2006.01)
F02B 53/04 (2006.01)
F02B 75/02 (2006.01)
F02G 3/02 (2006.01)

(52) U.S. Cl. ....... 123/258; 123/257; 123/27 R; 123/223; 60/39.6

(58) Field of Classification Search .......... 123/205–210, 123/216, 223, 48 D, 78 D, 316, 39, 68, 2, 123/258–261, 27 R, 568.11, 568.14; 60/39.6–39.63
See application file for complete search history.

(56) References Cited

U.S. PATENT DOCUMENTS

| | | | |
|---|---|---|---|
| 3,729,927 A * | 5/1973 | Graves | 60/39.6 |
| 3,967,611 A | 7/1976 | Goto | |
| 4,015,424 A * | 4/1977 | Shinohara | 60/39.6 |
| 4,033,304 A | 7/1977 | Luria | |
| 4,138,973 A | 2/1979 | Luria | |
| 4,174,683 A | 11/1979 | Vivian | |
| 4,215,659 A * | 8/1980 | Lowther | 123/68 |
| 4,864,989 A | 9/1989 | Markley | |
| 5,233,966 A * | 8/1993 | Berg | 123/27 R |
| 5,341,771 A | 8/1994 | Riley | |
| 5,592,904 A * | 1/1997 | Negre | 123/52.3 |
| 5,970,944 A | 10/1999 | Kawamura | |
| 6,073,605 A | 6/2000 | Matsuoka et al. | |
| 6,840,033 B2 * | 1/2005 | Adams | 60/39.6 |
| 6,941,907 B2 * | 9/2005 | Dixon | 123/78 D |
| 7,481,195 B2 * | 1/2009 | Nelson | 123/197.1 |
| 2005/0235957 A1 * | 10/2005 | Duncan | 123/429 |
| 2010/0095914 A1 * | 4/2010 | Evans-Beauchamp | 123/68 |

FOREIGN PATENT DOCUMENTS

DE  19835708 A1 *  2/2000  ................ 123/68

* cited by examiner

*Primary Examiner* — Willis Wolfe, Jr.
(74) *Attorney, Agent, or Firm* — Horst M. Kasper

(57) ABSTRACT

Method and apparatus to improve the efficiency of internal combustion engines in which compression and combustion of an Air/Fuel mixture is carried out without a compression stroke as used in conventional internal combustion engines and expansion of the combusted mixture is performed to increase the expansion ratio resulting in an increase in the amount of work extracted. An externally compressed Air/Fuel Mixture is combusted in a variable volume combustion chamber and expanded into a conventional cylinder displacing a power piston to produce rotation of a crankshaft to drive a vehicle or other device. Separation of the variable volume combustion chamber from the conventional cylinder eliminates the conventional Otto Cycle compression stroke and provides a substantially larger expansion ratio than the compression ratio in a conventional engine.

42 Claims, 10 Drawing Sheets

Section A-A

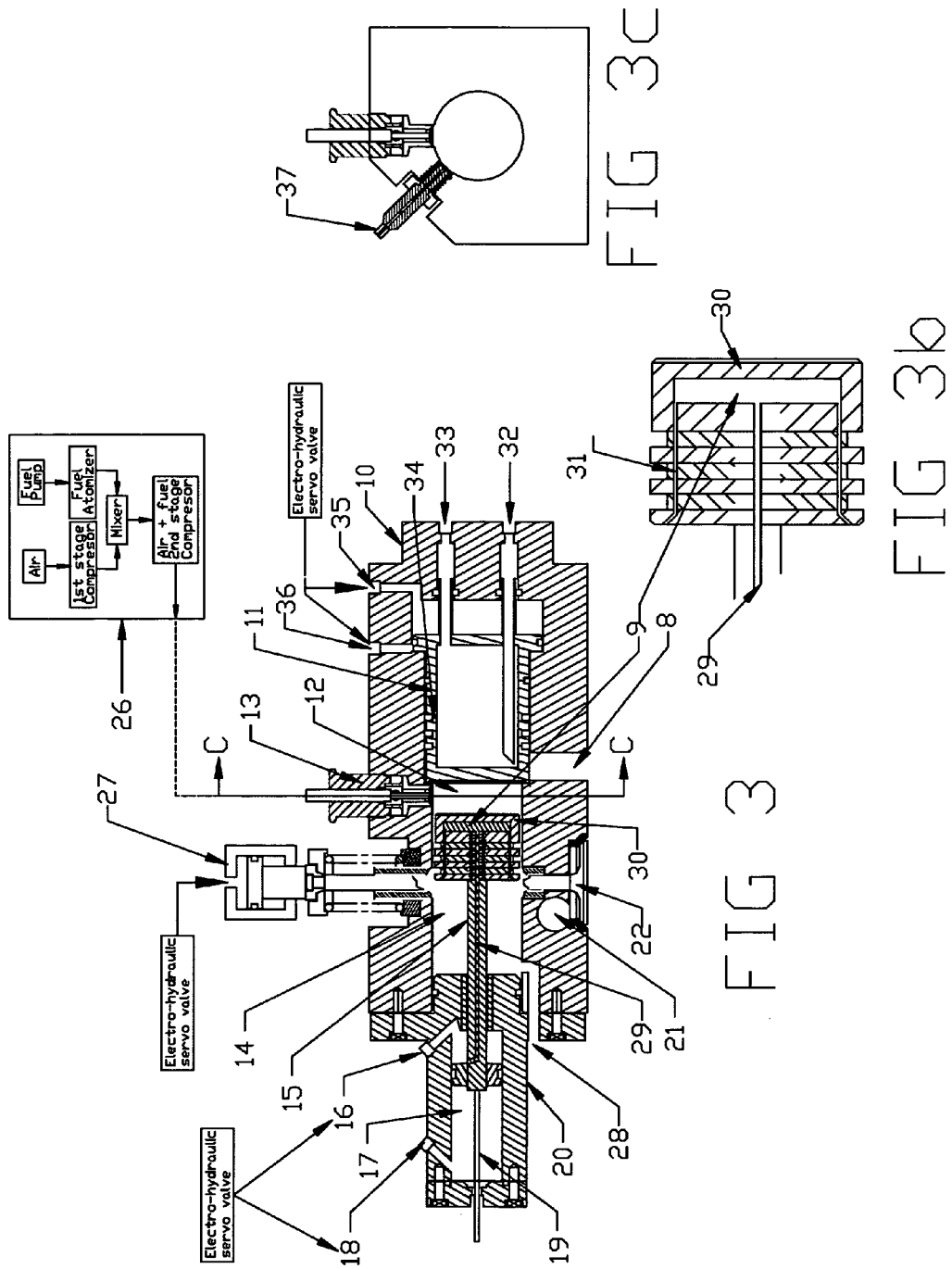

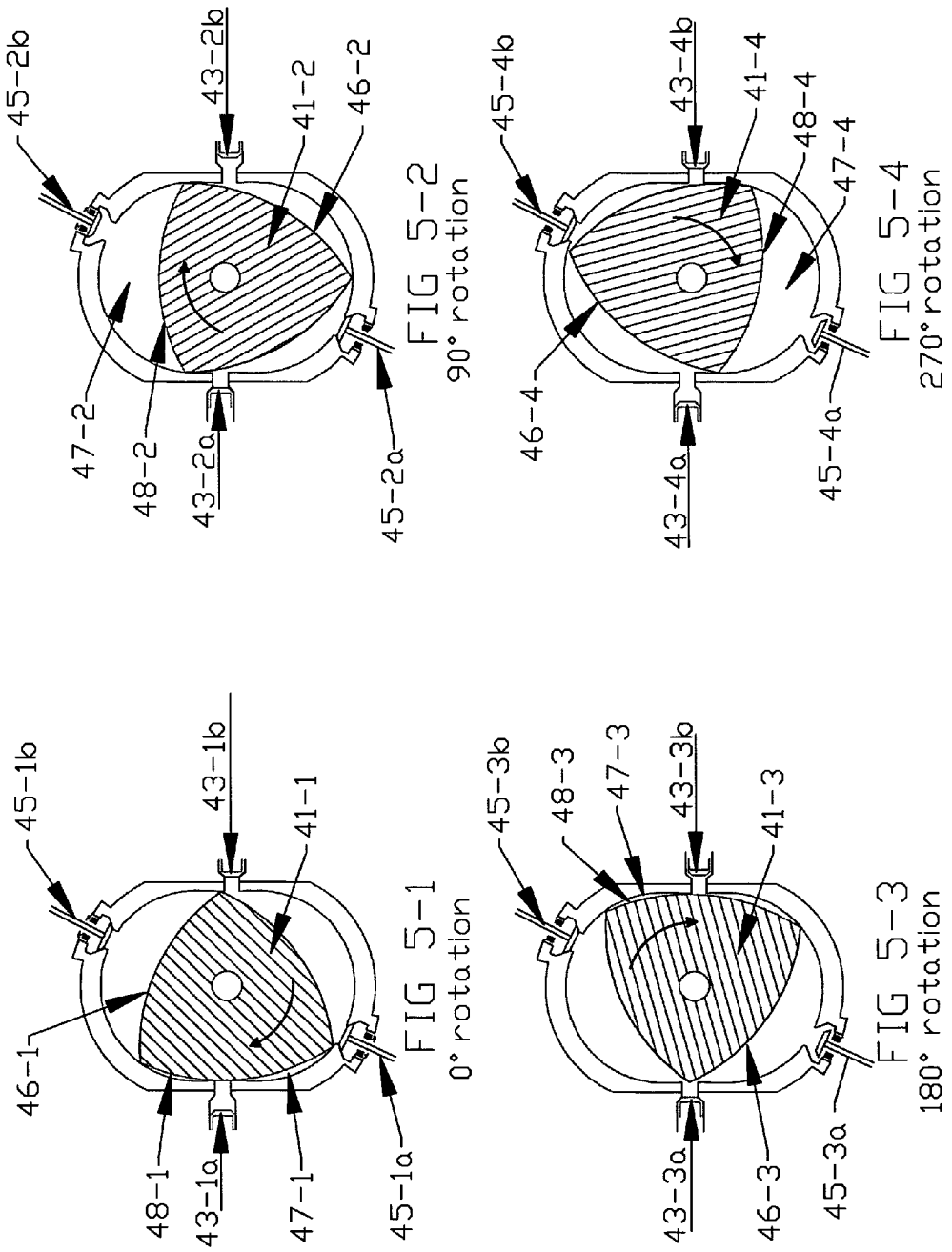

DEV CYCLE ENGINE

BACKGROUND OF THE INVENTION

The present invention, which is referred to as the DEV Cycle Engine, is designed to substantially improve the performance of internal combustion engines by improving combustion and extraction of energy from these engines. The focus of this invention relates to recovering more energy from combustion of an air-hydrocarbon fuel-mixture (hereafter called Air/Fuel mixture) or another types of fuel mixtures such as an hydrogen/oxygen or other fuel mixtures that are supplied to an internal combustion engine. It has been known that a large expansion ratio, that is the ratio of the volume of the combusted gases after expansion in the engine to the volume of the combusted gases at their maximum pressure in the combustion chamber, will extract more energy from the above Air/Fuel mixture and that the thermodynamic efficiency increases as the expansion ratio increases.

Most present day internal combustion engines have the same compression and expansion ratios due to inherent mechanical and combustion considerations. The compression ratio of a typical Otto cycle engine using gasoline as a fuel is usually limited to a range of values from 8 to 1 with an upper limit of approximately 12 to 1 depending upon such factors as the fuel mixture, fuel initial temperature just prior to compression, fuel "octane rating", power requirements needed, mechanical shape of the compression chamber, "hot spots", poor cooling of surfaces, and other considerations. For diesel fueled engines the typical compression ratio is approximately 16 to 1 and upwards to around 22 to 1 with much the same restrictions as for the gasoline engine. Other fuels present similar limitations.

Thermodynamics shows that compressing any gas (or any gas mixture) causes both the pressure and temperature of the gas to rise due to the energy added to the gas (from work performed compressing the gas). All combustible mixtures have a "kindling temperature" and upon reaching that temperature it will self-ignite. That self-ignition phenomenon, in an Otto Cycle engine, is known as "knocking" or "pinging" and can cause damage to the engine if allowed to continuously occur. In a diesel engine, that specific characteristic is used to spontaneously ignite the fuel. The typical sound of the diesel engine is the explosion of the fuel instead of igniting via a spark plug and then slowly (a few milliseconds) burning as in the Otto cycle.

Several techniques have been described in various patents that provide a method to "stretch" the compression restriction by providing a spring loaded piston connected to the main compression chamber such that as the compression pressure reaches a predetermined level it will cause the spring loaded piston to move in such a manner that effectively increases the "clearance volume" of the compression chamber and thereby limiting the pressure (somewhat) so that "knocking" does not occur. To a degree, the expansion ratio has been slightly increased thereby achieving an increase in efficiency. (See U.S. Pat. Nos. 5,341,771 and 5,970,944).

In other attempts to gain better fuel economy a "pre-combustion chamber" is utilized to allow better ignition of a small quantity of Air/Fuel mixture which then is used to ignite the balance of the fuel in the main power combustion chamber. In some cases the pre-combustion chamber is used to provide a "richer Air/Fuel mixture thereby allowing a "poorer" gas mixture, in the main power combustion chamber piston area, to be "reliably" ignited. (See U.S. Pat. No. 4,864,989). Sometimes the pre-combustion chamber is used to avoid significant mixing of a portion of the new fresh Air/Fuel mixture with spent "old burned gases" that would "dilute" the next new mixture decreasing the overall efficiency of the combustion process and reducing the utilization of the energy stored in the fuel (See U.S. Pat. No. 3,967,611). These "old burned gasses" occur because of incomplete purging of the power cylinder chamber at the end of the exhaust stroke.

Other prior patents have utilized complex mechanical methods to vary the clearance volume at the top of the stroke by raising or lowering the pistons, crankshaft and portions of the drive train (i.e. transmission) when low power demands of the engine allow a smaller amount of fuel to enter combustion volume. This also requires that the operation of the intake and exhaust valves be simultaneously modified to maintain the compression ratio such that it stays below the spontaneous ignition point. (See U.S. Pat. No. 4,174,683).

Other patents vary the intake valve timing that allows "over-lapping" of the intake valve with the compression stroke, thereby effectively changing the "apparent" compression ratio. Accompanying the varying intake valve closing procedure is an auxiliary spring loaded (or hydraulic positioning) piston to vary the "clearance volume" above the "power piston" head such that the compression stroke is maintained at a low enough value that is below the spontaneous ignition point. (See U.S. Pat. Nos. 4,033,304 and 4,138, 973).

In U.S. Pat. No. 6,073,605, the main combustion chamber only contains air, as the compression stroke nears the "top-dead-center" position (hereafter referred to as TDC), the temperature of the air has been raised to a very high temperature and pressure. Next, when the inter connecting valve (between the pre-combustion chamber and the main combustion chamber that includes the power piston chamber) is opened, the high pressure (and high temperature) air rushes into the pre-combustion chamber and ignites the fuel. This type of arrangement has several problems including incomplete burning of fuel due to incomplete mixing of air and fuel and also the extreme velocities of very hot gasses that would erode the valve mechanism between the chambers.

BRIEF SUMMARY OF THE INVENTION

The intent of the present invention is to concentrate on the real reason that an internal combustion engine has the ability to transform the energy stored in the fuel and use it to perform mechanical work. That is, to concentrate on having a large expansion of the gas (an expansion of 12 to 1 or greater and an upper limit of approximately 40 to 1). The compression performed by an external compressor, on the Air/Fuel mixture, is kept low (usually a compression of 7 to 1 or less but higher compression of 10 or more may be used) (or only performed on a small quantity of gaseous material in the case of the residual exhaust gasses) thereby reducing the loss of energy due to entropy.

Furthermore, it can be shown (SEE TABLE BELOW) that the compression process is actually a "lossy" energy operation. Compression ratio in the Otto cycle is the amount of decrease expressed as a ratio between the initial volume of the Air/Fuel mixture at the bottom of the intake stroke and then divided by the volume of the Air/Fuel mixture at the top of the compression stroke. Due to entropy considerations, not all of the energy used to compress a gas can be recovered Since no energy conversion process is 100% efficient.

The Cases included in the following table represent a comparison of the effect of various compression and expansion ratios on the net work available from an engine. In the table below certain general criteria were followed;
In ALL cases displayed:

1. The amount of Air/Fuel mixture was identical.
2. Adiabatic conditions were assumed
3. The total amount of energy generated from the combustion of the Air/Fuel Mixture was the same for all cases.

|        | Compress | Expand | Units of Work |
|--------|----------|--------|---------------|
| Case A | 8:1      | 8:1    | 100           |
| Case B | 10:1     | 8:1    | 98            |
| Case C | 2.17:1   | 8:1    | 109           |
| Case D | 10:1     | 10:1   | 108           |
| Case E | 10:1     | 26.7:1 | 143           |
| Case F | 8:1      | 26.7:1 | 144           |
| Case G | 6:1      | 26.7:1 | 146           |

Case A represents a "typical" Otto cycle engine with equal compression and expansion ratios, and 100 units of work can be extracted from the fuel supplied. In case B, increasing the compression ratio while maintaining the same expansion ratio only 98 units of work can be obtained. The difference is due to the increased amount of energy used to compress the Air/Fuel mixture and not all of this energy can be recovered due to entropy. It is a "lossy" operation. Conversely in case C, decreasing the compression ratio while maintaining the expansion ratio results in an INCREASE of 9% in work extracted. Finally in case D, increasing the compression AND the expansion ratio results in a small increase of 8% over the "typical" engine (but NOT as much increase as when the compression ratio was DECREASED).

In the DEV cycle engine a large increase in the expansion ratio (in cases E, F, G) results in a significant increase in units of work obtained. Furthermore, reducing the compression ratio continues to increase the work obtained over the "typical" Otto cycle engine.

Additionally, in a typical Otto cycle engine there is dilution by "old burned gasses" (in cases A, B, C, and D the calculations INCLUDED purging the Otto cycle by assuming that no "old burned gasses remained in the combustion chamber to dilute the incoming air/fuel mixture) further reducing the ability to achieve as high a net work as calculated above (in cases A or D).

Given the fact that the DEV Cycle engine has a significantly greater expansion ratio than any Otto cycle engine it is apparent that more energy will be extracted from a given amount of Air/Fuel mixture. When the theoretical amount of energy that is available (in identical amounts of Air/Fuel mixture) is calculated via thermodynamic analysis (using both the Otto cycle and the DEV cycle) at least a 40% improvement is obtained in the DEV Cycle engine.

A similar result is true for the Diesel cycle. It is true that at very low power settings, both the Diesel cycle and the DEV cycle have large expansion ratios (with the DEV Cycle engine preferably having a somewhat larger ratio). However, at very high power settings (such as climbing a long hill) the Diesel cycle has quite low expansion ratios which partially accounts for the reduced fuel economy under these conditions. There are two reasons for this reduced fuel economy under these load conditions because of the way fuel is introduced into the diesel engine combustion chamber. In a typical diesel engine the fuel injector system operates at a constant pressure and the time required to introduce the fuel into the cylinder increases in proportion to the quantity of fuel being injected. During the time required to inject the larger quantity of fuel under full load conditions the piston in the cylinder is moving from TDC increasing the volume in which the fuel is being combusted and reducing the remaining volume in the cylinder for expansion of the combusted Fuel/Air mixture as the piston moves to BDC at the end of the power stroke. This increasing volume is accentuated under these conditions because the engine operating speed is usually substantially higher because the vehicle is operating in a lower gear resulting in more piston movement during the time required to inject the fuel. This progressive decrease in the volume for expansion during the time that the fuel is injected reduces the effective expansion ratio to as low as 5 to 1 when the injection of the fuel is completed.

Contrary to general belief, the standard Otto cycle is MORE EFFICIENT under maximum power settings than is the Diesel cycle under maximum power settings. NOTE: In most applications, neither the Otto cycle nor the Diesel cycle engines operate at (or very near) maximum power settings for more than a small percentage of their life time. The DEV cycle engine, as described below, can also be operated a lower rotational speeds due to the increased torque thereby extending engine life due to the fact that the DEV Cycle engine produces one power stroke per crankshaft revolution. Compared to a Diesel engine the DEV cycle is more efficient at all comparable power settings.

The internal combustion engine is a "heat engine", as defined by thermodynamics. As such, the energy, stored in the fuel, when burned, raises the temperature and pressure of the combusted gases. These two physical properties of converted energy, the increased temperature and pressure of the gases, are used, for example in an automobile, to propel the vehicle. This happens by using the pressure and temperature acting on the automobile engine's "power-piston". As the "power-piston" moves due to the force acting on the face of the piston, the clearance volume above the piston increases and the pressure starts to drop as the hot gas expands. As the gas expands, the pressure and temperature drop and the energy stored in the burned gas is converted into "work". In addition, this invention contemplates various methods of minimizing the mixing of old burned gasses and their assorted combustion products with the new Air/Fuel mixture to better control the combustion process and improve overall engine efficiency.

The process in developing the DEV cycle engine started with the concept that a particular cylinder that was filled with an Air/Fuel mixture at approximately atmospheric pressure (a wide open throttle) would generate the maximum power output in a typical Otto cycle engines. As shown in the Table above increasing the compression, and with equal expansion such as the comparison between Case A and Case D produces an expected but modest increase in net output. Further analysis disclosed the fact that expansion in excess of compression, as shown between Case A and Case C also produced an increase in output and that increase in output was somewhat larger than that obtained by merely increasing the compression.

Additional calculations, as shown in Cases E, F and G were undertaken and the results show not only a much more substantial increase in net output but also the fact that higher ratios between compression and expansion produced increases in net output. The ratio between compression and expansion in Case E is 2.67, in Case F is 3.3375 and in Case G is 4.45. The conclusion reached from the analysis of these calculations was that increased net output was achievable by making substantial increases in expansion of the combusted Air/Fuel mixture. The amount of compression of the Air/Fuel mixture before combustion did not dramatically effect the net output at high expansion ratios.

This analysis led to the solution; what was needed was a large expansion ratio (maybe 20:1) that would be able to extract a very large amount of energy from the fuel burned. This solution required that the volume which contained the Air/Fuel mixture before combustion be significantly smaller (i.e. 20 or more times smaller) than the volume that the combusted mixture would expand into to produce the output from the engine. This then required that the density of the Air/Fuel mixture be increased so that it could be packed into this smaller volume.

In a conventional Otto Cycle engine the compression of the Air/Fuel mixture occurs in the same chamber as the combustion process. The requirement of a small volume for the compressed Air/Fuel mixture and a large volume for expansion cannot be accomplished in this conventional configuration. The solution to this problem resulted in the DEV Cycle engine which is the subject of this invention.

Based on the required mechanisms to achieve these different compression and expansion volumes it became evident that there would not be a need for a compression stroke (and only a marginal intake period), and the engine became the functional equivalent of a two (2) stroke engine. This meant that the quantity of each Air/Fuel mixture charge would only need to be one-half of the Air/Fuel mixture charge to be comparable to the power of a four (4) stroke Otto cycle operating at the same rotational speed or the engine could operate at one half of the rotational speed with the same quantity of Air/Fuel mixture. The Air/Fuel mixture needed to be prepared, compressed and increased in density by up to approximately ten (10) times. In a DEV Cycle engine this would produce a net power output comparable to conventional Otto Cycle engines of the same displacement.

However, higher or lower density increases are also contemplated at both maximum engine output and at idle and partial output operation. This required an air compressor to increase the density and ALSO to push the Air/Fuel mixture thru passageways to each combustion chamber of a single or multiple cylinder engine. This compression also allowed for a greatly increased mixing of the air and fuel.

In separating the combustion volume from the expansion volume as conceived in the DEV Cycle engine it is desirable to minimize the mixing of "old burned gasses" from combustion of the Air/Fuel mixture from previous cycle with the next compressed Air/Fuel mixture, especially at idle and operation at engine outputs lower than the maximum. Minimizing this mixing can be accomplished by displacing or purging the "old burnt gasses" from the combustion volume. In the preferred embodiment the "old burnt gasses" are displaced from the combustion volume. The capability of displacing the "old burnt gasses" from the combustion volume also provided the means to vary the volume of this combustion volume to accommodate efficient operation at idle and partial output operation. This capability to displace the "old burnt gasses" allows a "PURE" Air/Fuel mixture in the combustion volume that would burn more completely and cleaner, rather than a diluted one, that exists in a typical Otto cycle engine.

After combustion of the Air/Fuel mixture in the combustion volume the combustion products are released and expanded into the expansion volume to displace the piston and produce net work from the engine. To maximize the net output it is desirable to have the expansion volume (the cylinder in a conventional Otto Cycle engine as well as the cylinder in the preferred embodiment of the DEV Cycle engine) as close to zero when the combustion gasses are introduced into the cylinder and the expansion to the maximum cylinder volume occurs as the piston is displaced from the top position (TDC) to the bottom of the stroke (BDC).

The DEV Cycle engine performance, because the Air/Fuel mixture is inserted into the combustion volume which the "old burnt gasses" have been displaced or "purged", is not affected by exhaust system "back-pressure" in the expansion volume as in an Otto cycle engine (other than pumping losses associated with removing the "old spent gasses") which would allow somewhat smaller components in the exhaust system.

In addition, the realization that maximum power was generally needed for short periods (in the preferred embodiment of the DEV Cycle engine) allowed somewhat smaller expansion ratios to occur at maximum power demands without significantly affecting overall engine efficiency. This reduced the need for a significant increase in compression of the Air/Fuel mixture with an "offsetting" of entropy losses while obtaining a satisfactory amount of work from the fuel. In the DEV engine compression of the Air/Fuel mixture is beneficial for the operation of the engine at ALL power settings including during IDLING because the effective expansion ratio is increased.

In a DEV Cycle engine, in a preferred method for preparing the Air/Fuel mixture for introduction into the combustion volume, the air at ambient conditions is initially compressed to a fairly low pressure (around 40 PSIG) which will cause the air temperature to rise to about 285 degrees Fahrenheit. At this point the air is allowed to escape into a primary (heat insulated) volume via a nozzle and simultaneously the fuel is also injected into the same primary volume via a very fine spray nozzle in the immediate location of the air nozzle. This results in a significant mixing of the two substances. Next, the Air/Fuel mixture is further compressed by approximately 25% to 150% which raises the pressure to the range of 70 PSIG to about 275 PSIG (the 275 PSIG representing a compression ratio of approximately 10 to 1) depending upon the needs of the engine and the time constraints due to high RPM and piping flow resistance. The temperature will also rise (at the higher pressure requirement) to some value near 600 degrees Fahrenheit. (NOTE: This is still a low enough temperature that self detonation will not occur. However this high temperature will likely cause (any or most) of the fuel that might still be a liquid to become gaseous. Furthermore, the additional compression will cause significant turbulence thereby further mixing the Air/Fuel mixture to a homogeneous condition. These techniques for compression and mixing of the air and fuel are known to the art.

The term "power piston" will be used throughout this invention EVEN IN THE INSTANCE where the "power piston" is not a piston. It might be more thought of as a "power actuator device" and is not limited to "INLINE" reciprocating types of engines, but also rotating "power actuator devices" that may or may not have aligned pistons such as radial aircraft engines or the rotary "WANKEL engine" or a screw or vane style motor.

It is an object of the present invention to provide a more efficient internal combustion engine by maximizing the expansion of the combustion gasses to extract more work from the combustion process.

It is a further object of the present invention to separate the combustion of the Air/Fuel mixture in a separate chamber from the chamber in which the combustion gasses expand to generate the output energy from the engine.

It is a further object of the present invention to provide a combustion chamber which has virtually no residual exhaust gasses intermixed with the incoming Air/Fuel mixture.

It is an additional object of the present invention to utilize a variable volume combustion chamber which is essentially fully purged of old burned gasses before the introduction of a fresh Air/Fuel mixture.

It is an additional object of the present invention to utilize a variable volume combustion chamber whose volume is varied to increase and decrease with volume related to increased or decreased output requirements of the engine.

It is an additional object of the present invention to provide for compression of the gaseous component of the Air/Fuel mixture external to the combustion chamber.

It is an additional object of the present invention to provide for a communicating valve between the combustion chamber and the power piston chamber which is opened during the engine operating cycle when the pressure differential between the gasses in the combustion chamber and the power piston chamber are minimized.

It is a further object of the present invention to minimize the volume of old burned gasses being compressed in the operating cycle of the engine.

It is a further object of the present invention to provide an engine that can operate on a wide variety of gaseous and liquid fuels.

It is also an object of the present invention to provide a high torque engine that operates at lower rotational speeds thus extending engine life.

It is an additional object of the present invention to provide an engine with a combustion chamber capable of producing thorough combustion of the fuel in the Air/Fuel mixture over a wide range of engine loads and range of pressure of the Air/fuel mixture in the combustion chamber.

It is also an object of the present invention to provide an engine with substantially improved fuel economy.

Specifically, the invention in the preferred embodiment consists of six (6) functional items. (1) a variable volume combustion chamber with an Air/Fuel injector and an ignition source, (2) a movable piston to adjust the size of the variable volume combustion chamber, (3) a position sensor which may be internal or external, (4) a valved communication port that connects the variable volume combustion chamber with (5) a power piston chamber and (6) an exhaust valve that performs two functions. The first function is to exhaust a very large part of the "old burned gasses" from the last power stroke. The second function is to "trap a small portion of the "old burned gasses" in the power piston chamber shortly (approximately 10_degrees) prior to reaching TDC. There is an additional component (not part of this invention that is well understood by the prior art) that is used to mix and compress the Air/Fuel mixture, with appropriate limitations, to provide the desired amount of Air/Fuel mixture to be inserted into the variable volume combustion chamber.

The volume of the variable volume combustion chamber is changed via an appropriate method such as a movable piston, movable enclosure, or other volume variation techniques. The Air/Fuel mixture has been added to the variable volume combustion chamber via a suitable method such as an intake valve, fuel injector, or other suitable devices that can handle an adequate quantity of Air/Fuel mixture quickly. Similarly, the ignition source may be a standard type spark plug, a significant increase in pressure or temperature, or other high energy emitting device such that it will cause the Air/Fuel mixture to ignite.

The valved communication port connects the variable volume combustion chamber with the "power piston chamber" as previously identified. In the preferred embodiment, the valved communication port is in the closed position during the period of time that the variable volume combustion chamber is being filled with an Air-Fuel mixture. This means, that except for the fuel injector, the variable volume combustion chamber is a completely closed chamber.

At a point just prior to the time that the power piston has reached its' "top-dead-center" position (hereafter called TDC) the ignition process is initiated. This ignition point varies depending on several factors such as rpm, power required, speed of combustion, and others. The typical ignition point is somewhere between 25 degrees and 5 degrees before TDC.

Shortly after the Air/Fuel mixture has essentially completely burned raising the temperature and pressure, the valved communication port opens and connects the variable volume combustion chamber with the "power piston chamber" and the "power stroke" begins. At some point (shortly after TDC) the variable volume combustion chamber is starting to be reduced in volume via the movable piston. The volume is reduced to essentially zero (0) volume at (approximately 100 degrees after TDC). Reducing the volume of the variable volume combustion chamber "purges" this volume of the spent "old burned gasses" that would dilute the next quantity of Air/Fuel mixture such that the available concentration of oxygen is significantly reduced. This dilution is particularly evident during the starting of the engine and at low power level settings. As a result of this dilution, in standard Otto cycle engines, extra fuel (a richer Air/Fuel mixture) must be present at those settings for reliable igniting of the fuel. This extra fuel does not have adequate oxygen for complete combustion and is discharged, partially unburned, out the exhaust system and into the atmosphere.

After the variable volume combustion chamber has been "purged" the valved communication port starts to close. At this point the "power stroke" is only partially over. The closing of the valved communication port occurs rapidly. Then the intake port (valve, fuel injector, etc.) will open and the Air/Fuel mixture will have started to refill the "purged" variable volume combustion chamber as the "power piston" continues to travel downward to the bottom of its' stroke (BDC 180 degrees from TDC). This maximum lowest travel position is called "bottom dead center" (and will be hereafter called BDC).

Once the "power piston" has reached its' BDC the exhaust valve opens and the "exhaust stroke" begins. With the exhaust valve open, the old burned gasses are allowed to exit the "power piston chamber" and also exit the engine. The exhaust valve remains open thru most of the next 130° degrees of the "exhaust stroke". At approximately 40±20 degrees prior to reaching TDC the exhaust valve starts to close and is completely closed by 20±10 degrees before TDC. This then means that some exhaust gasses are "trapped" in the "power piston chamber". As the "power actuator" continues to move towards TDC the trapped exhaust gasses are being compressed. In the preferred embodiment of this invention, the clearance volume in the "power piston chamber" is designed to be as small as mechanically and realistically practicable at TDC. The distance between the top of the "power actuator chamber" and the top of the "power actuator" might be only 0.050 inches when cold. This distance (and resulting clearance volume) is only as large as the thermal expansion of metals would need at maximum design operating temperatures. At maximum operating temperature the distance might be as small as 0.002 inches. This very small volume will cause a significant rise in temperature and pressure of the exhaust gasses trapped in the "power actuator chamber". Since the residual burned exhaust gasses are virtually devoid of any combustible material there is no spontaneous ignition during compression. This rise, of temperature and pressure and other functions, will be controlled by an on-board "engine control computer" (not part of this invention) since the exact amount of increase depends on multiple variables such as power levels, operating temperatures, engine rpm, temperature expansion of metals, time to open and close the exhaust valve, and others. The intent is to achieve a pressure in the "power actuator chamber" that is essentially equal to the pressure in the variable volume combustion chamber after when the Air/Fuel mixture has been ignited and has virtually completely burned. This has been calculated to be around 1100 PSI.

The reason for having a small as possible clearance volume (and still meet thermal expansion needs) is to compress a very small quantity of gas, in this case the old burned gasses, so that a very small amount of energy is needed to raise the pressure to around 1100 PSI. By only having a small quantity of gases to be compressed, the amount of energy that is needed to compress the gasses is small and reduces the energy that will be lost due to entropy.

The reason for raising the pressure to 1100 PSI is to have the pressure differential be minimized across the communication port valve when the communication port valve starts to open. If the pressure differential is minimized across the valve there will be a minimal flow of gasses between the variable volume combustion chamber and the power piston chamber at the point that the valve begins to open. Minimizing the pressure differential and therefore the flow of combusted gases at the point that the valve opens will avoid severe erosion of the valve and valve seat. As the communication port valving continues to open, the "power actuator" starts to move down towards BDC. The pressure in the "clearance volume" above the "power actuator" will start to drop and there will be a small amount of the hot burned gasses starting to flow across the valve seat. Since the communication port valve seat is quite wide open, at this point, the velocity of the hot flowing gasses is small and the possible erosion damage to the valve seat is small. At this point the "exhaust stroke" has ended and the "power stroke" will begin again.

In the above description it can be seen that there is a "power stroke", "then an exhaust stroke". The typical "intake stroke" in a standard Otto cycle four (4) stroke engine does not exist in the DEV cycle engine as a separate stroke. Instead, the DEV cycle engine Air/Fuel mixture intake period occurs during the last part of the "power stroke" and continues thru a portion of the "exhaust stroke". This is possible because the variable volume combustion chamber is isolated from the power piston cylinder chamber by the valved communication port. Also, in the DEV cycle engine, there is no separate "compression stroke". In reality, there is no compression stroke at all in the DEV cycle engine, as in the typical Otto cycle engine. Even though there is a compression of the "old burned gasses" near the end of the exhaust stroke (it has no relation or similar purpose as in the typical Otto cycle).

There is a separate compressor, external to this invention, used to completely homogenize the air and fuel for complete burning and to compress the Air/Fuel mixture to be injected directly into the variable volume combustion chamber and then have enough capability to force the Air/Fuel mixture into the variable volume combustion chamber within the time constraints of the RPM of the engine. At idling RPM's, the pressure might be as low (or lower depending on multiple factors) as 25 PSIG. At full power and maximum RPM the pressure might be expected to be as high as 275 PSIG (or even higher). There are multiple types of compressors and compression techniques that are well known and commercially available that could be adapted for this purpose.

A further reason to utilize an Air/Fuel mixture compressor is to increase the density of the Air/Fuel mixture. This allows the Air/Fuel mixture to be placed into a smaller "burning chamber" (the variable volume combustion chamber) volume but still have its full measure of energy available to produce the required work. Since the volume of Air/Fuel mixture at the time of combustion is small (or smaller than it would be without the increase in density), the expansion ratio becomes larger than it otherwise would be.

As a result, the DEV cycle engine operates using two (2) cycles and then repeats those two (2) cycles over and over again without the inherent disadvantages of the standard two cycle engine which typically have large amounts of "old burned gasses" intermixed with the incoming Air/Fuel mixture. This means that the available torque at a given engine RPM in the DEV cycle engine is significantly larger than in any standard Otto cycle engine where it requires 4 cycles to produce a power stroke with the same amount of energy produced in the DEV engine 2 cycles These and other advantages of the invention will be apparent to those of ordinary skill in the art by reference to the following detailed descriptions and the accompanying drawings.

BRIEF DESCRIPTION OF THE DRAWINGS

FIG. 3 is an enlargement of the replacement head shown in FIG. 1. It is a cross section (taken lengthwise thru the center) of the DEV cycle head.

FIG. 3b is an enlarged view of the variable volume adjustment piston head showing coolant passages.

FIG. 3c shows a cross section C-C (taken perpendicular to the cross section of FIG. 3) showing the location of a sparkplug.

FIG. 5-1 thru 5-4 (all part of FIG. 5) is a simplified illustration of the triangular epitrochoid rotor in four (4) clockwise sequential positions approximately 90 degrees apart. The initial position (FIG. 5-1) of the rotor is in the same position as it is shown in FIG. 4.

DETAILED DESCRIPTION OF THE INVENTION

Figure 1:
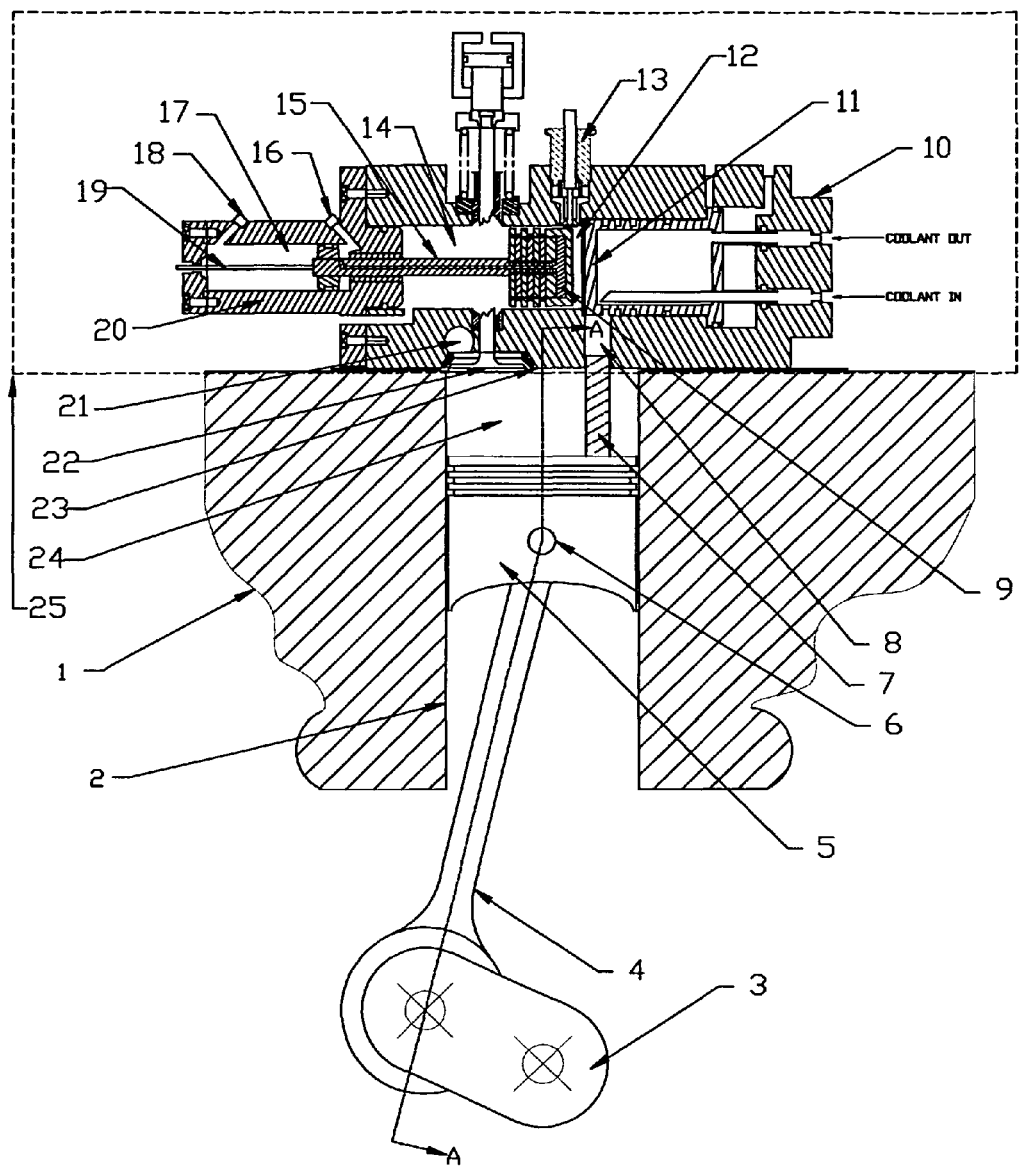
FIG. 1 shows the overall arrangement of an engine with the standard head removed and replaced by the preferred embodiment of the DEV cycle head for one cylinder including a modification to the typical piston top.

FIG. 1 depicts the preferred embodiment of the DEV Cycle Engine invention comprising cylinder block 1, containing cylinder bore 2, and power piston 5. Power piston 5, is rotatably connected by wrist pin 6, to one end of connecting rod 4. The opposite end of connecting rod 4, is rotatably connected to a journal of crankshaft 3, thru connecting rod 4. Power piston 5, has modification 7 which is an integral extension of power piston 5, that extends upward from the top of power piston 5, that is used to completely "fill" the volume of valved passageway connection 8, when power piston 5, is at TDC.

Engine head adapter assembly 25, contains head block 10, having communication port valve 11, connecting to valve passageway 8, Air/Fuel mixture injector 13, an ignition method sparkplug 37, or other method (not shown in FIG. 1. See FIG. 3c), adjustment space 14, for movement of variable volume adjustment piston 15, to modify the size of variable volume combustion chamber 12, and coolant passage 9, in variable volume adjustment piston 15. The position of variable volume adjustment piston 15, is controlled by volume 17, along with position sensor 19, that is controlled by a hydraulic servo valve (see FIG. 3) supplying hydraulic fluid via port 16, and port 18. Also in adapter assembly 25, is exhaust valve 22, that connects volume 24, located above power piston 5, to typical engine exhaust system 21.

Figure 2:
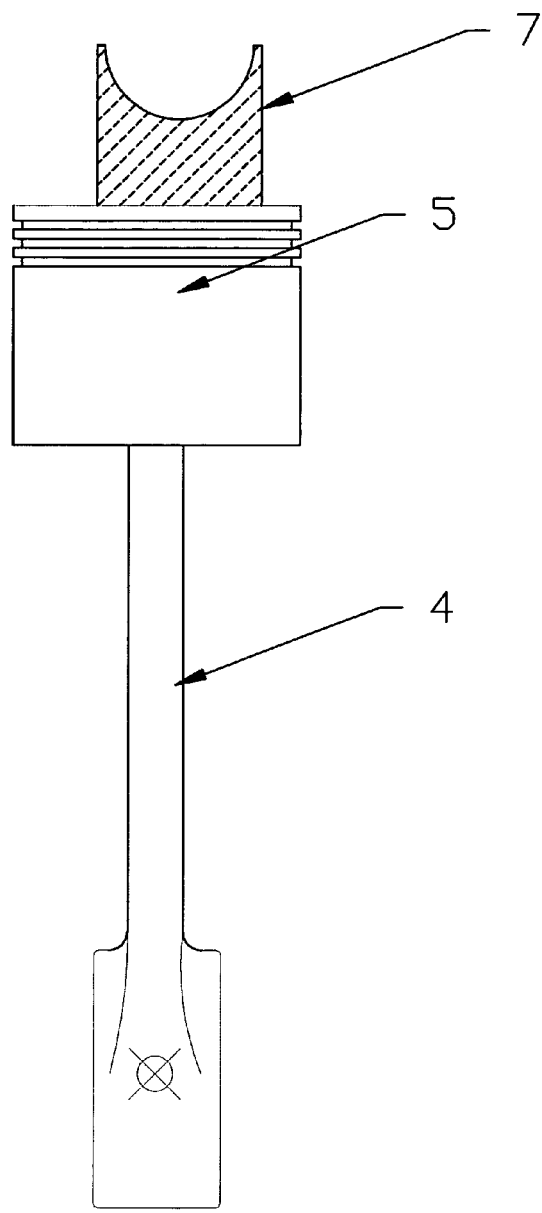
FIG. 2 is an enlargement of the modified piston top rotated 90 degrees to show the circular shape of the top of the modification.

FIG. 2 is a view of the power piston assembly 5, showing modification 7, to the power piston 5. The modification 7, shows a curved circular upper portion that will comfortably fit around the communication port valve 11. Modification 7, is part of the concept of having as small a volume for valved passageway connection 8, as practical when the residual "old burned gasses" are compressed near the end of the exhaust stroke.

Figure 3A:
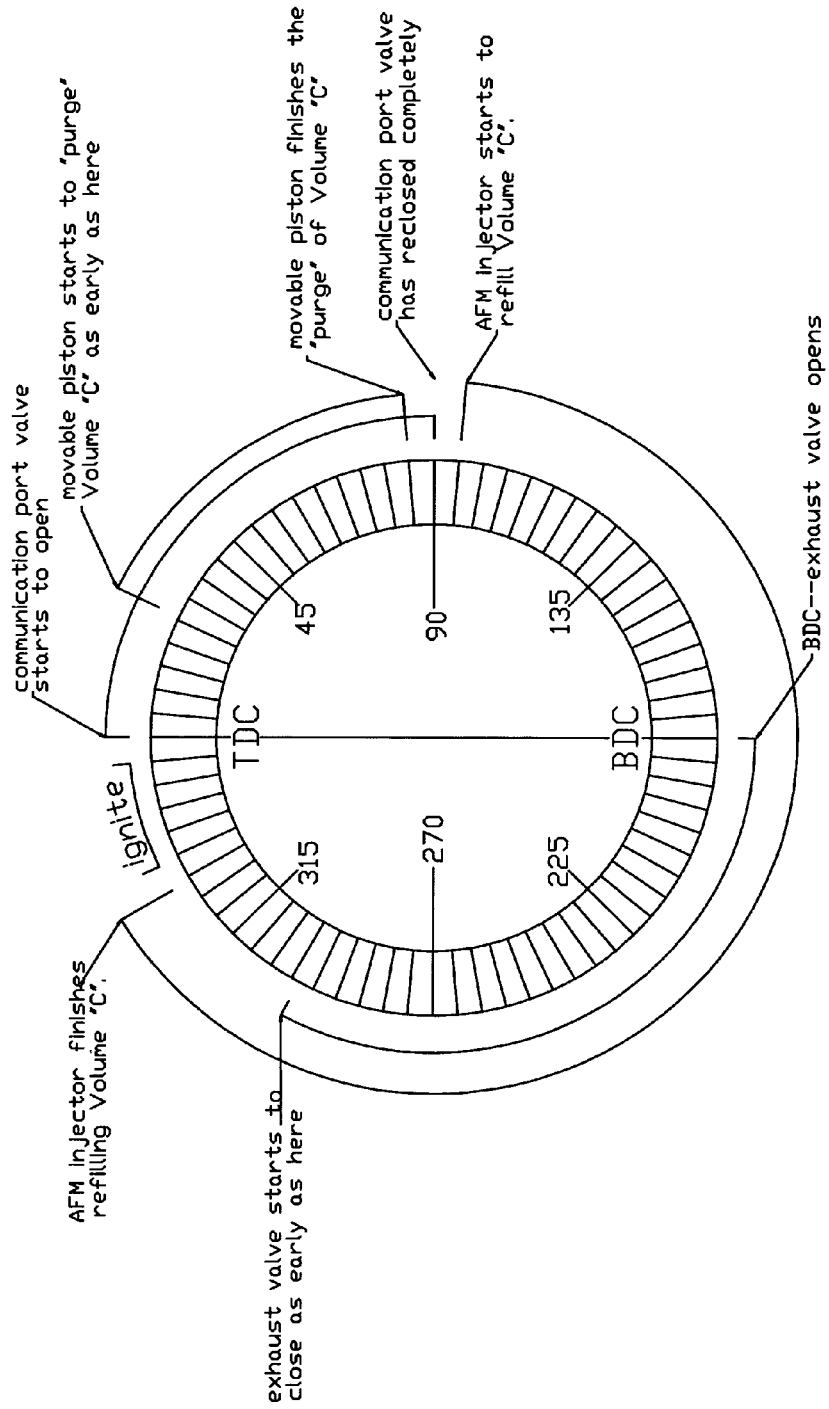
FIG. 3a is representation of the timing (per one revolution) of the DEV Cycle Engine showing of each event and its' relationship to each other.

In FIG. 3, engine head adapter assembly 25, (in FIG. 1) is shown enlarged. During operation of the DEV Cycle engine variable volume combustion chamber 12, is filled with a pressurized and significantly homogenized Air/Fuel mixture from Air/Fuel mixture compressor 26, whose major consideration is to obtain a complete and thoroughly homogenized and pressurized mixture that can rapidly be injected into the variable volume combustion chamber 12, (the specific design of the compressor is not part of this invention) via injector 13. Variable volume adjustment piston 15, adjusts variable volume combustion chamber 12, to an appropriate size which determines the quantity of Air/Fuel mixture (which controls the amount of energy developed). The position of variable volume adjustment piston 15, is "sensed" by position sensor 19, and controlled by a hydraulic servo valve (not part of this invention) using an on-board engine control computer (also not part of this invention). Hydraulic fluid supplied via port 18, in housing 20, fills volume 17, and provides a "hard stop" (NOTE: hydraulic fluid is almost incompressible—approximately 5% by volume per 1000 PSI) for variable volume piston 15. A pressurized hydraulic fluid is supplied via port 16, that is used to provide movement, to the left, of variable volume adjustment piston 15. This hydraulic fluid is also used to cool the piston head 30, via passageway 29, and volume 9). The coolant is removed via port 28.

Shortly before the power piston 5, has reached TDC the Air/Fuel mixture is ignited by sparkplug 37, (not shown in this view, see FIG. 3c). After ignition, when power piston 5 has reached TDC and the Air/Fuel mixture has finished burning, variable volume combustion chamber 12, is connected to valved communication port 8, by moving communication port valve 11, to the right using a servo valve supplying pressurized hydraulic fluid to port 36, thereby opening the valved passageway connection 8. The very hot (and high pressure) just burned Air/Fuel mixture will travel thru valved passageway 8, to volume 24, (see FIG. 1) thereby providing the energy to cause power piston 5, to move down in cylinder bore 2 towards bottom-dead-center (BDC). This operation begins the power cycle of the DEV engine.

The very hot gasses (more than 2000° F.) can severely damage the components they are in contact with. As a result, the two (2) movable pistons, communication port valve 11, and piston head 30, (part of variable volume adjustment piston 15) must be cooled. A small passageway 29, connects coolant entry port 16, with volume 9, that removes heat from the head of piston 30. The pressurized coolant used is also a lubricant (such as hydraulic oil) that is allowed to escape thru multiple small passageways 31, (see FIG. 3b)) around the periphery of piston head 30, into volume 14. This "spray of oil" lubricates the walls of volume 14. The coolant is removed via port 28, and recovered and cooled/filtered to be recycled. Communication port valve 11, is cooled via entry port 32, and the coolant is removed via port 33, (both ports are located in head block 10). The coolant, in this case, can be any appropriate liquid and could be the same type of liquid used to cool piston head 30. A very small amount of coolant (if it is a lubricant) will be allowed to escape into one of ring grooves via port 34, to provide lubrication for the piston.

After power piston 5, has started down towards BDC, (at some point generally prior to the half-way point down towards BDC), variable volume adjustment piston 15, starts to move towards the right thereby making variable volume combustion chamber 12, smaller. This movement continues while power piston 5, moves towards BDC. The variable volume adjustment piston 15, continues until the volume of variable volume combustion chamber 12, has been reduced to virtually zero. At this point "purge" of variable volume combustion chamber 12, has been completed.

After the variable volume adjustment piston 15, has reduced variable volume combustion chamber 12, to almost zero volume, communication port valve 11, moves to the left by supplying pressurized hydraulic fluid to port 35, closing valved passageway connection 8, and providing a "hard stop" keeping the valve seat firmly closed. This allows Air/Fuel mixture injector 13, to open and begin to fill variable volume combustion chamber 12, with a fresh charge of Air/Fuel mixture as power piston 5, reaches BDC and variable volume adjustment piston 15, is moved to the left to accommodate the incoming Air/Fuel mixture.

After power piston 5, has reached BDC, exhaust valve actuator 27, causes exhaust valve 22, to open and connect to volume 24, to typical engine exhaust system 21. At this point power piston 5, starts to move upwards from BDC towards TDC and the exhaust portion of the DEV engine cycle starts. At some point when power piston 5, moves (more than half way up towards TDC), exhaust valve 22, closes. This means that there remains trapped in volume 24, some amount of old burned exhaust gasses. As power piston 5, continues moving upwards towards TDC the trapped gasses are compressed such that the pressure in volume 24, might reach as much as 1100 PSI.

Prior to power piston 5, reaching TDC, injector 13, has finished filling variable volume combustion chamber volume 12, with a new fresh charge of Air/Fuel mixture. Then at some point, about 15 (±10) degrees before TDC, ignition occurs in variable volume combustion chamber 12 and a new power stroke begins.

An alternative method of operation for FIG. 3 is described here. It reduces the need to compress the "old burned gasses" to 1100 or more PSI.

As indicated above in the preferred embodiment of this invention, volume 24, in "power piston" cylinder bore 2, is designed to be as small as mechanically and realistically practicable at TDC. The distance between the top of power piston 5, and the top of cylinder bore 2, might be only 0.050 inches when cold. This distance (and resulting clearance volume 24) is only as large as the thermal expansion of metals would need at maximum design operating temperatures. At maximum operating temperature the distance might be as small as 0.002 inches. This very small volume will cause a rise in temperature and pressure of the exhaust gasses that are trapped in the "power piston cylinder as the power piston 5, rises towards TDC.

During the exhaust stroke (from the previous power stroke) power piston 5, moves upward towards TDC. At some upper position in the exhaust stroke (when power piston 5, has moved up to a point about 10_before ignition) exhaust valve 22, closes. (The ignition point is determined by the number of degrees of "spark advance" required.)

During this time (the last few degrees before ignition) power piston 5, continues traveling upwards towards TDC and this action will compress the old burned gasses which causes the pressure to rise in volume 24, to a pressure that is essentially equal to the pressure of the Air/Fuel mixture supplied to the variable volume combustion chamber 12. After ignition, the burning of the Air Fuel Mixture causes the pressure to rise in variable volume combustion chamber 12. It is unlikely that the two pressures will increase at the identical rate. However, the "on board computer" can reasonably predict when the two pressures are quite close to the same pressure using the "history" of the last several engine cycles and the thermodynamics of several known data settings such as pressure, position, RPM, and probable temperatures.

Simultaneously with ignition, communication port valve 11, is starting to open. Since it is likely that the two pressures are not exactly equal, some transfer of gasses will occur. However, the gas pressure generated by the burning of the Air/Fuel mixture is rising rapidly, but is located at the interface between variable volume combustion chamber 12, and volume 24. As a result, very minimal mixing will occur to the unburned Air/Fuel mixture.

Figure 4:
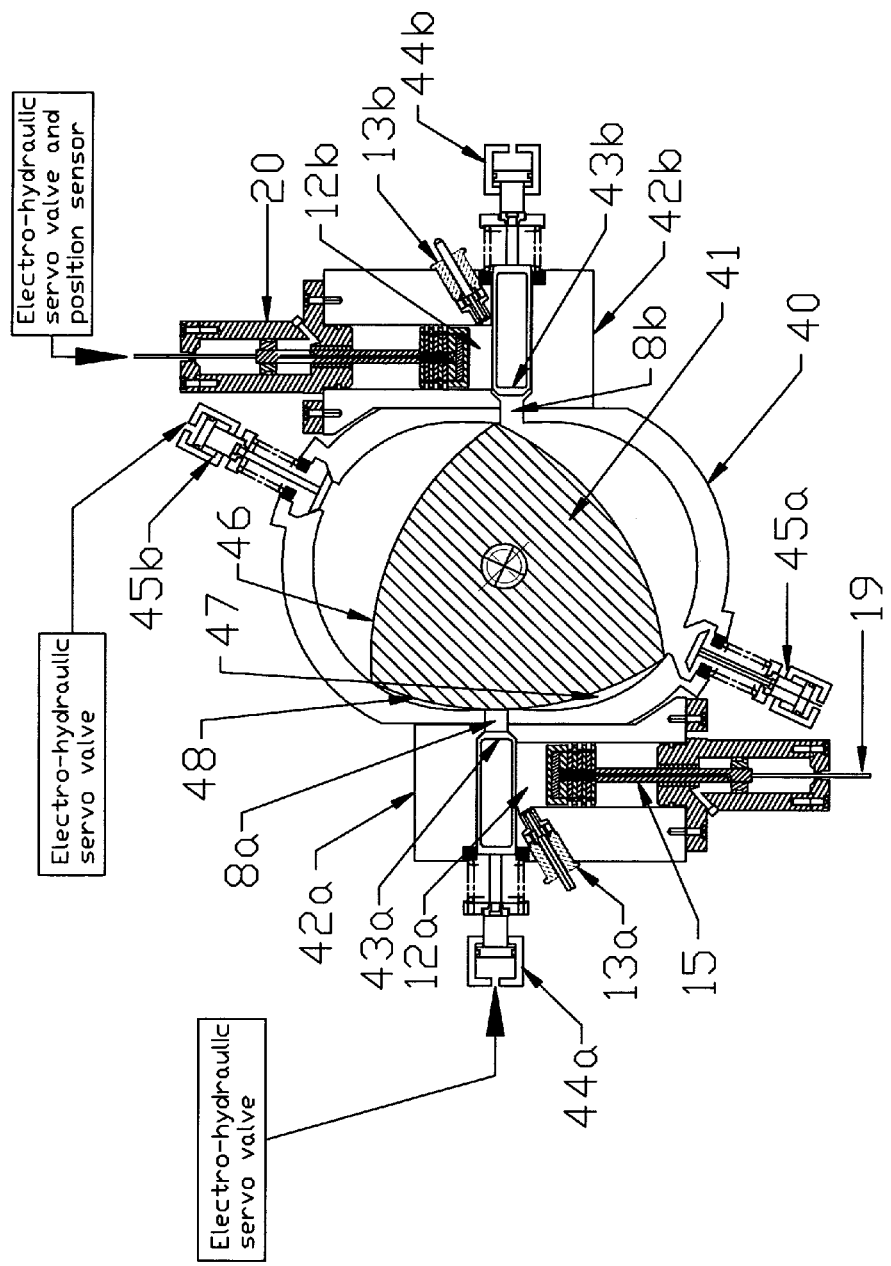
FIG. 4 shows another embodiment of the DEV Cycle applied to a rotary WANKEL type of engine.

An alternate embodiment incorporated in a Wankel style engine is illustrated in FIG. 4. This type of engine does not use pistons, instead the rotary equivalent component is a triangular epitrochoid rotor, hereafter called TE ROTOR 41. Incorporated into the WANKEL style engine are dual DEV cycle style head adapter assemblies with variable volume combustion chambers that supply pre-measured quantities of Air/Fuel mixture to each "chamber" in the engine. Also, dual exhaust valves, one for each "chamber" that is used (that are computer controlled) and are also an added requirement.

Pressurized Air/Fuel mixture is inserted via a fuel injector into a variable volume combustion chamber in the DEV cycle engine head adapter assembly. The variable volume combustion chamber has been calculated to provide the optimum quantity of Air/Fuel mixture for the energy required. The Air/Fuel mixture is ignited by a sparkplug (or other suitable device) prior to the TE ROTOR 41, reaching a minimum volume.

After ignition, and after the TE ROTOR 41, has rotated a small amount and reached the minimum volume point, the valved passageway to the TE ROTOR 41, is opened allowing hot gasses to produce a clockwise rotation force on TE ROTOR 41. This is the beginning of the power cycle of the DEV-WANKEL engine cycle.

As in the prior description of the DEV cycle sequence of operations for the reciprocating piston OTTO cycle style engine, in the DEV-WANKEL engine cycle there is no separate intake phase for the Air/Fuel mixture, nor is there any compression phase of the Air/Fuel mixture. The intake period of the Air/Fuel mixture occurs during the last portion of the power phase and the initial portion of the exhaust phase.

There are only two (2) phases during 180 degrees of rotation for each surface of the TE ROTOR 41. Therefore during the first 180 degrees, each of the three (3) surfaces under goes a power phase and an exhaust phase. Each surface of the TE ROTOR 41, has a power phase that lasts for 90 degrees, and an exhaust phase that lasts for about another 50 (±30) degrees, at which time the exhaust valve closes and the remaining trapped "old burned gasses" are then compressed to some high pressure (possibly as high as 275 psig) during the remainder of rotation of the exhaust phase. Then after the first 180 degrees of rotation another power phase starts. During the next 180 degrees of rotation the three (3) surfaces have another sequence of power phases for a total of six (6) power phases per 360 degrees of rotation.

FIG. 4 is a representative cross section of a WANKEL style engine. Housing 40, encloses a triangular epitrochoid rotor, hereafter referred to as TE ROTOR 41, that is supplied with an Air/Fuel mixture from dual DEV cycle style engine head adapter assemblies 42a, 42b, and dual exhaust valve systems 45a, and 45b. Communication port valve actuators 44a, and 44b, move communication port valves 43a, and 43b, to open and close the connection to valved passageways 8a and 8b. As shown, communication port valve actuator 44a, has closed communication port valve 43a. The pressurized Air/Fuel mixture is inserted via fuel injector 13a, into variable volume combustion chamber 12a. Variable volume adjustment piston 15, has been located to allow a calculated quantity of Air/Fuel mixture for the energy required. Prior to when TE ROTOR 41, relative to surface 48, is in the position shown in FIG. 4, the Air/Fuel mixture is ignited by a sparkplug (not shown in this view but whose position is located behind fuel injector 13a, but rotated approximately 45° degrees away from fuel injector 13a). When TE ROTOR 41, has reached the position shown, communication port valve actuator 44a, moves communication port valve 43a, to open, by moving communication port valve 43a, to the left. The hot, burned, Air/Fuel mixture gasses are allowed to enter volume 47, via valved passageway 8a, thereby exerting a rotatable force on TE ROTOR 41. The power cycle of TE ROTOR 41, has now begun.

When TE ROTOR 41, has rotated to the position shown in FIG. 5-3, another power cycle will again be applied to TE ROTOR 41. This will be the second time that TE ROTOR 41 has under gone a power cycle during a single 360° degree rotation of TE ROTOR 41.

FIGS. 5-1, 5-2, 5-3, and 5-4 are simplified illustrations of the TE ROTOR 41, at various positions during a 360° degree rotation. Exhaust valve 45-1a, (in FIG. 5-1) has been closed during the compression of the "trapped" old burned gasses. The trapping of the old burned gasses is for a similar reason stated above for the Otto cycle engine (to reduce damage to the valve seat of communication port valve 43-1a). When TE ROTOR 41-1, reaches the position shown in FIG. 5-1, ignition occurs. A few degrees later the communication port valve 43-1a, opens allowing the hot burned gasses into volume 47-1. The force generated by the hot burned gasses causes clockwise rotation of TE ROTOR 41-1. Then the rotation (approximately 90±10 degrees) of TE ROTOR 41-2, is next shown in FIG. 5b.

FIG. 5-2 shows the results of 90° degrees of rotation of TE ROTOR 41-2. At this point, volume 47-2, has reached its maximum volume (therefore maximum expansion) and exhaust valve 45-2b, opens. At some additional rotation the exhaust valve 45-2b, will close and the remaining "trapped" old burned gasses will be compressed to a high pressure (small volume).

FIG. 5-3 shows that TE ROTOR 41-3, has rotated approximately 180° degrees clockwise. Volume 47-3, in FIG. 5-3, is in the same general position (relative to FIG. 5-1, and to communication port valve 43-1a), but 180° degrees later to communication port valve 43-3b. Ignition then occurs and the sequence of FIG. 5-3, proceeds until it has reached the position shown for FIG-4.

FIG. 5-4 shows that volume 47-4, has almost expanded to maximum and exhaust valve 45-4a, and will open shortly.

FIG. 5-5 shows the relative timing sequence of one surface 48 of the WANKEL style engine of FIG. 4 and in FIG. 5-1 thru 5-4. The preceding sequence illustrates the functioning of the WANKEL style engine using the variable volume combustion chamber which completely eliminates the compression of the Air/Fuel mixture in the WANKEL style engine rotor chamber.

Figure 6:
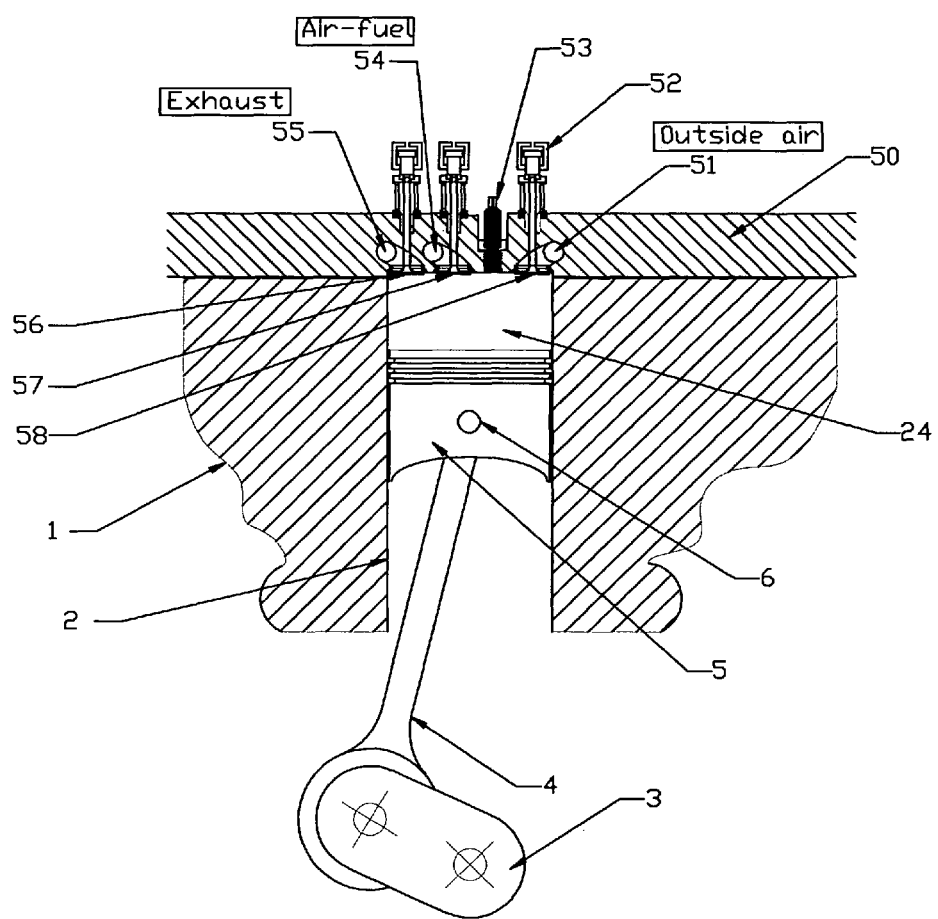
FIG. 6 is an alternate embodiment of the heat engine that the invention contemplates. In this case the modification to a standard Otto cycle engine does not require any changes to the pistons or block components.

FIG. 6 displays a modification to head 50, of an Otto cycle style engine that has more than two (2) valves (two (2) intake and/or (2) exhaust valves) per cylinder. In FIG. 6 three (3) valves are shown. When valve actuator 52, opens "fresh air valve" 58, the clearance volume 24, is connected to the surrounding atmosphere via port 51. "Air/fuel mixture valve" 57, when open allows the Air/Fuel mixture to enter via port 54, into clearance volume 24. Exhaust valve 56, when opened, allows the burned gasses in clearance volume 24, to escape via exhaust port 55, into a typical exhaust system.

Figure 6A:
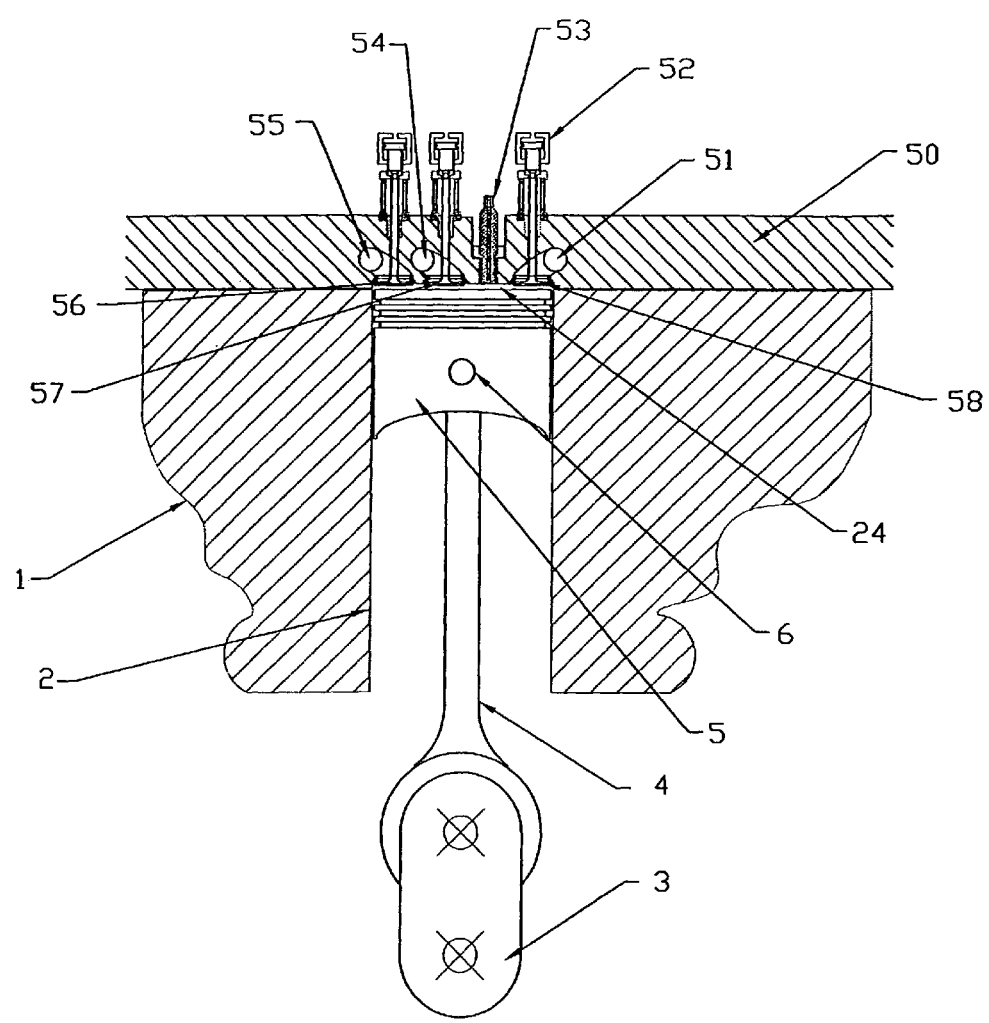
FIG. 6a shows the power piston 5, in its TDC position showing the very small "clearance volume" that produces a significant increase in the expansion ratio.

FIG. 6a describes the sequence of functions when power piston 5, is at TDC. Head 50, of a typical production engine has been "milled down" about 0.250 inches to reduce the clearance volume 24 above power piston 5. The distance from the top of power piston 5, to the head 50, is about 0.400 inches in many new engines. In order to provide an expansion ratio of about 20±5, (when the stroke is 3 inches) the distance at TDC may only be about 0.150±0.050 inches.

Assume that the Air/Fuel mixture has been pressurized to 200 PSIG at port 54, and prior to TDC the Air/Fuel mixture has been inserted through Air/Fuel mixture valve 57 into volume 24, and has been ignited by sparkplug 53, by the time that power piston 5, has reached TDC. This is the beginning of the $1^{St}$ stroke. Power piston 5, travels down to BDC and the power stroke is finished.

Next, exhaust valve 56, opens (the beginning of the $2^{nd}$ stroke) and power piston 5, travels up to TDC causing a large majority of the old burned gasses (approximately 95% due to the small clearance volume 24) to be exhausted out of the engine. When TDC is reached exhaust valve 56, is closed and fresh air valve 58, is opened allowing clearance volume 24 to be connected to the external atmosphere. As power piston 5, travels down (the $3^{rd}$ stroke) to BDC, fresh air is drawn into clearance volume 24, and mixes with the residual "old burned gasses" that have remained in clearance volume 24, significantly diluting the balance of the "old burned gasses". At BDC fresh air valve 58, is closed and exhaust valve 56, is again reopened.

Power piston 5, starts to travel up (the beginning of the $4^{th}$ stroke) towards TDC and further purges the old burned gasses". This continues for about 70% of the travel upwards. Exhaust valve 56, is then closed. This is the end of the exhaust stroke and Air/fuel mixture valve 57, is opened which starts the beginning of the fuel intake process during a small portion of the last 30% of the $4^{th}$ stroke.

During a portion of the balance of the end of the $4^{th}$ stroke, the Air/Fuel mixture (which is pressurized) is rapidly filling clearance volume 24. At approximately 10% before TDC the air-fuel mixture valve 57, is closed. This is the end of the intake process.

The last 10% (approximately 18 degrees) of the stroke allows the appropriate selection of the amount of advance of the ignition point.

It can be seen that there is NO portion of the four stroke cycles devoted to compression. Further it can be seen that a significant portion of the four strokes is devoted to purging the "old burned gasses" to obtain a more complete and cleaner burning of the Air/Fuel mixture. Lastly, the thermodynamic value of a very large expansion ratio is obtained.

Figure 7:
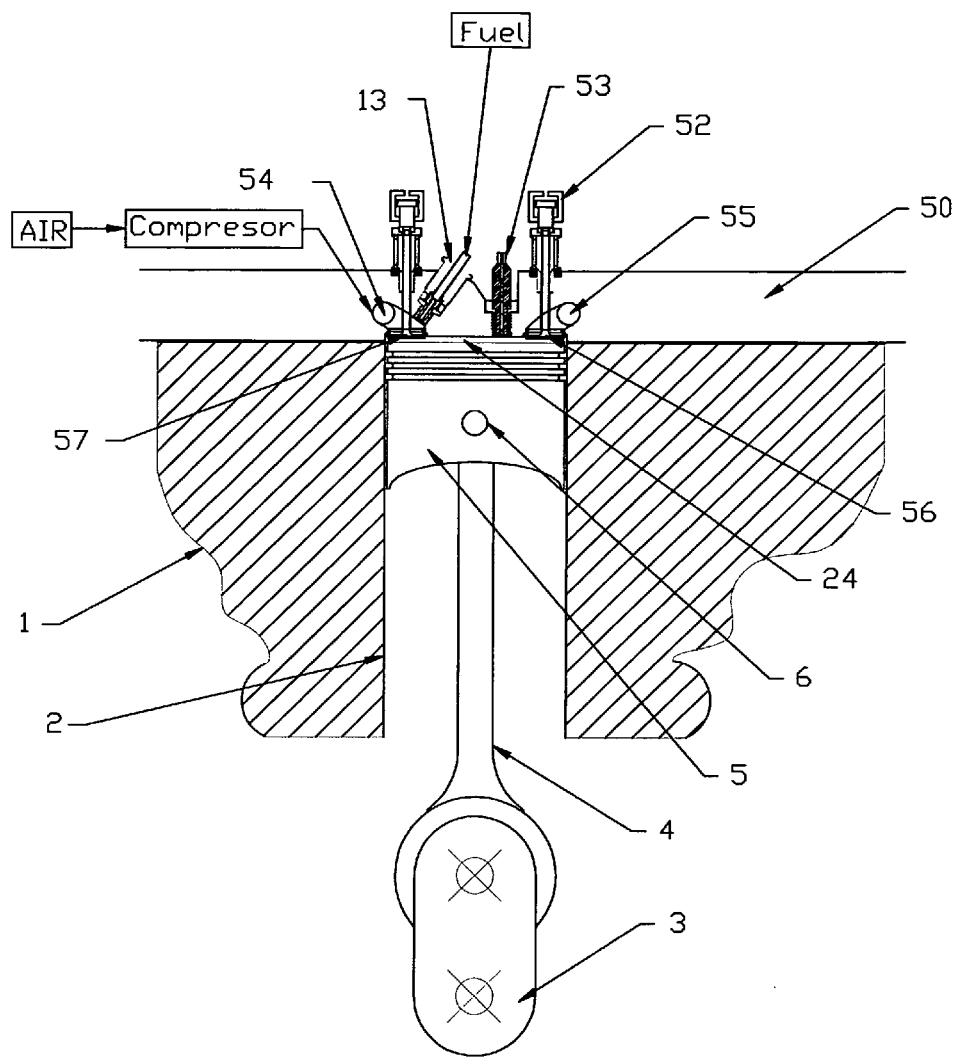
FIG. 7 is another alternate embodiment of a heat engine that the invention contemplates.

FIG. 7 describes another embodiment of the multiple valve engine described in FIG. 6 and FIG. 6a. This figure displays a modification to head 50, of an Otto cycle style engine that has at least two (2) valves (one intake valve 57, and one exhaust valve 56) per cylinder. In FIG. 7 in addition to intake valve 57 and exhaust valve 56 shown, injector valve 13 shares the intake valve 57, operation. When valve actuator 52, opens exhaust valve 56, the clearance volume 24, is connected to well understood typical exhaust system via port 55. The intake valve 57, when open, allows the "fresh air" to enter via port 54, and into clearance volume 24. The typical "exhaust valve" 56, allows the burned gasses in clearance volume 24, to escape via port 55 into a typical exhaust system.

There is an "air compressor" (not part of this invention) that is used to take-in "fresh" air and compress it to some useful value that might vary from 20 PSIG up to as much as 275 PSIG. The "fresh" air pressure is used to: (1) purge a portion of the "old burned gasses" out of volume 24, (2) to supply an appropriate amount of air that will mix with the pure fuel supplied by fuel injector 13, for the next power stroke.

FIG. 7 is used to describe the sequence of functions when power piston 5, is at TDC. Head 50, of a typical production engine has been "milled down" about 0.250 inches to reduce the clearance volume above power piston 5. The distance from the top of power piston 5 to head 50 in a standard Otto cycle engine is about 0.400 inches in many new engines. In order to provide an expansion ratio of about 20±5, (when the stroke is 3 inches) the distance at TDC may only be about 0.150±0.050 inches.

Assume that prior to TDC that both "fresh air" and a new "pure fuel charge" has been inserted into clearance volume 24, and has then been ignited by sparkplug 53, by the time that power piston 5, has reached TDC. This is the beginning of the $1^{st}$ stroke. Power piston 5, travels down (180° of rotation of crank-shaft 3) to BDC and the power stroke is finished at which point exhaust valve 56, is opened.

Power piston 5, starts to travel up (the beginning of the $2^{nd}$ stroke) towards TDC and begins to remove the "old burned gasses". This continues for about 80% (approximately 150 degrees of rotation of crank-shaft 3) of the travel upwards and at this point intake valve 57, opens. (note: exhaust valve 56, is still open.) This allows the "fresh air" to significantly purge the remaining "old burned gasses" and replace them with "fresh air".

Power piston 5 continues to travel towards TDC and at a total rotation of crank-shaft 3, of 155 degrees of rotation exhaust valve 56, closes. Fuel injector 13, now sprays very high pressure fuel into the opening of intake valve 57, while simultaneously fresh air is also entering the clearance volume 24. This continues for up to an additional 10 degrees of rotation (for an approximate total of 165 degrees of rotation) at which point fuel injector 13, stops adding fuel and intake valve 57, closes. This is the end of the intake stroke.

At some point after 165 degrees of rotation of crank-shaft 3 (but prior to TDC at 180 degrees of rotation) ignition occurs and the next power stroke begins.

It can be seen that there is NO portion of the two stroke cycles devoted to compression. Further it can be seen that a significant portion of stroke 2 is devoted to purging the "old burned gasses" to obtain a more complete and cleaner burning of the Air/Fuel mixture. Lastly, the thermodynamic value of a very large expansion ratio is obtained.

I claim:

1. An improved internal combustion engine which is comprised of a pressurized air/fuel mixture intake means, an ambient air intake means, a power piston chamber containing a power piston which power piston is connected by conventional means to a rotating crankshaft, which is further comprised of a minimum volume combustion chamber formed in said power piston chamber when said power piston is located at top dead center of said engine's rotation cycle, an ignition source and an exhaust valve wherein said improved internal combustion engine produces one power stroke for each two rotations of said crankshaft in the following manner, a pressurized air and/or air fuel mixture is injected into power piston chamber close to the top of the stroke, wherein the mixture is ignited, the gas is expanded, after the expansion of the combusted air/fuel mixture and expulsion during the "exhaust stroke" in which the power piston displaces the combusted gases being followed by a stroke in which ambient pressure air is drawn into the power piston chamber by movement of the power piston as in a conventionally aspirated engine and that mixture of ambient air and the residual combustion air/fuel mixture after the valve admitting the ambient air is closed is expelled through the exhaust valve, which closes as the power piston approached the top of the cylinder at which point the compressed air fuel mixture is again introduced into the top of the power piston chamber and ignited for the initiation of another "power stroke".

2. An improved internal combustion engine which is comprised of a pressurized air/fuel mixture intake means, an ambient air intake means, a power piston chamber .containing a power piston which power piston is connected by conventional means to a rotating crankshaft, which is further comprised of a minimum volume combustion chamber formed in said power piston chamber when said power piston is located at top dead center of said engine's rotation cycle, an ignition source and an exhaust valve wherein said improved internal combustion engine produces one power stroke for each rotation of said crankshaft in the following manner; a pressurized air and/or air/fuel mixture is injected into power piston chamber commencing just after the top of the stroke after said exhaust valve is closed, wherein the mixture is ignited, the gas is expanded, after the expansion of the combusted air/fuel mixture and expulsion during the "exhaust stroke" in which the power piston displaces the combusted gases which closes as the power piston approaches top of the cylinder at which point the compressed air/fuel mixture is again introduced into the top of the power piston chamber and ignited for the initiation of another "power stroke".

3. A method for improving the efficiency of internal combustion engines in which an air/fuel mixture is formed, compressed and combusted without the use of a conventional compression stroke and the resulting combustion products are expanded to produce work such that the expansion ratio is substantially larger than the compression ratio in a conventional Otto Cycle engine wherein said engine operates with only a power stroke followed by an exhaust stroke for each power piston providing a power stroke from each expansion and full rotation of the crankshaft and wherein a mixture of ambient air and the residual combustion air/fuel mixture after the valve admitting the ambient air is closed is expelled through the exhaust valve, which closes as the power piston approached the top of the cylinder at which point the compressed air fuel mixture is again introduced into the top of the power piston chamber and ignited for the initiation of another "power stroke".

4. An improved internal combustion engine wherein the combustion air is compressed by external means before being introduced into one or more combustion chambers wherein an air/fuel mixture is ignited and burned and expanded to displace one or more power pistons, whereby the displacement of said power piston or pistons transfer the energy created by the combustion and expansion of said air/fuel mixture to output mechanical energy wherein said engine operates with only a power stroke followed by an exhaust stroke of each power piston providing a power stroke from each power piston chamber for each full rotation of the crankshaft.

5. An improved two cycle internal combustion engine wherein the air/fuel mixture is compressed by external means before being introduced into one or more combustion chambers wherein said air/fuel mixture is ignited and burned and expanded to displace one or more power pistons, whereby the displacement of said power piston or pistons transfer the energy created by the combustion of said air/fuel mixture to output mechanical energy and wherein a rotation of a screw assembly transfers the energy created by the combustion and expansion of said air/fuel mixture to output mechanical energy from said engine.

6. An improved rotary screw type engine which is comprised of a variable volume combustion chamber, a communicating valve which connects said variable volume combustion chamber to the intake port of said rotary screw type engine by means of a communicating valve port, whereby an air/fuel mixture is ignited and burned in said variable volume combustion chamber where said combusted air/fuel mixture is expelled through said communicating valve into said rotary screw type engine causing rotation of the screw assembly in said rotary screw type engine, whereby said rotation of said screw assembly transfers the energy created by the combustion and expansion of said air/fuel mixture to output mechanical energy from said engine.

7. An improved rotary screw type engine as described in claim 6 wherein the volume of said variable volume combustion chamber is reduced to approximately zero volume after ignition and combustion of the air/fuel mixture in said variable volume combustion chamber during the period when said communicating valve is open to said power piston chamber.

8. An improved rotary screw type engine as described in claim 6 wherein said air/fuel mixture is ignited in said variable volume combustion chamber by further compressing said air fuel mixture caused by further reducing the volume of said variable volume combustion chamber to initiate ignition as is typical for diesel engines.

9. An improved rotary screw type engine as described in claim 6 wherein the air/fuel mixture is compressed by external means from ambient atmospheric pressure to up to approximately ten (10) times ambient atmospheric pressure before being injected into said variable volume combustion chamber.

10. An improved rotary screw type engine as described in claim 9 in which the combustion air is compressed external to the variable volume combustion chamber but fuel is injected into said variable volume combustion chamber prior to ignition.

11. An improved Wankel-style internal combustion engine which is comprised of a variable volume combustion chamber, a communicating valve which connects said combustion chamber to the power piston chamber, whereby an air/fuel mixture is ignited and burned in said variable volume combustion chamber from which combusted air/fuel mixture is expelled through said communication valve into said power piston chamber causing displacement of a power piston, whereby said displacement of said power piston transfers the energy created by the combustion and expansion of said air/fuel mixture to output mechanical energy from said engine.

12. An improved internal combustion engine as described in claim 11 in which the pressure in said variable volume combustion chamber, after combustion of said air/fuel mixture, is approximately equal to the pressure in the power piston chamber as the power piston in said power piston chamber reaches the point in said engines rotation when the volume in said power piston chamber is minimized and said communicating valve begins to open.

13. An improved internal combustion engine as described in claim 11 wherein the volume of said variable volume combustion chamber is reduced to approximately zero volume after ignition and combustion of the air/fuel mixture in said variable volume combustion chamber during the period when said communicating valve is open to said power piston chamber.

14. An improved internal combustion engine as described in claim 11 wherein said air/fuel mixture is ignited in said variable volume combustion chamber by further compressing said air/fuel mixture caused by further reducing the volume of said variable volume combustion chamber to initiate ignition as is typical for diesel engines.

15. An improved internal combustion engine as described in claim 11 wherein the air/fuel mixture is compressed by external means from ambient atmospheric pressure to up to approximately ten (10) times ambient atmospheric pressure before being injected into said variable volume combustion chamber.

16. An improved internal combustion engine as described in claim 15 in which the pressure in said variable volume combustion chamber, after combustion of said air/fuel mixture, is approximately equal to the pressure in the power piston chamber as the power piston in said power piston chamber reaches the point in said engines rotation when the volume in said power piston chamber is minimized and said communicating valve begins to open.

17. An improved internal combustion engine as described in claim 15 in which the combustion air is compressed external to the variable volume combustion chamber, but fuel is injected into said variable volume combustion chamber prior to ignition.

18. An improved internal combustion engine as described in claim 17 in which the pressure in said variable volume combustion chamber, after combustion of said air/fuel mixture, is approximately equal to the pressure in the power piston chamber as the power piston in said power piston chamber reaches the point in said engines rotation when the volume in said power piston chamber is minimized and said communicating valve begins to open.

19. An improved internal combustion engine which is comprised of a variable volume combustion chamber, a communicating valve which connects said variable volume combustion chamber to a power piston chamber by means of a communicating valve port, whereby an air/fuel mixture is ignited and burned in said variable volume combustion chamber from which said combusted air/fuel mixture is expelled through said communicating valve into said power piston chamber causing displacement of a power piston, whereby the displacement of said power piston transfers the energy created by the combustion and expansion of said air/fuel mixture to output mechanical energy from said engine, wherein said engine operates with only a power stroke followed by an exhaust stroke for each power piston providing a power stroke from each power piston chamber for each full rotation of the crankshaft.

20. An improved internal combustion engine as described in claim 19 in which the pressure in said variable volume combustion chamber, after combustion of said air/fuel mixture therein, is approximately equal to the pressure in the power piston chamber as the power piston in said power piston chamber reaches top dead center and said communicating valve begins to open.

21. An improved internal combustion engine as described in claim 19 wherein the air/fuel mixture is compressed by external means from ambient atmospheric pressure to up to approximately ten (10) times ambient atmospheric pressure before being injected into said variable volume combustion chamber.

22. An improved internal combustion engine as described in claim 21 in which the pressure in said variable volume combustion chamber, after combustion of said air/fuels top dead center and said communicating valve begins to open.

23. An improved internal combustion engine as described in claim 21 in which the combustion air is compressed external to said variable volume combustion chamber as set forth in claim 21, but fuel is injected into said variable volume combustion chamber prior to ignition.

24. An improved internal combustion engine as described in claim 23 in which the pressure in said variable volume combustion chamber, after combustion of said air/fuel mixture therein, is approximately equal to the pressure in the power piston chamber as the power piston in said power piston chamber reaches top dead center and said communicating valve begins to open.

25. An improved internal combustion engine as described in claim 19 wherein the volume of said variable volume combustion chamber is reduced to approximately zero volume after ignition and combustion of the air/fuel mixture in said variable volume combustion chamber during the period when said communicating valve is open to said power piston chamber.

26. An improved internal combustion engine as described in claim 25 in which the pressure in said variable volume combustion chamber, after combustion of said air/fuel mixture therein, is approximately equal to the pressure in the power piston chamber as the power piston in said power piston chamber reaches top dead center and said communicating valve begins to open.

27. An improved internal combustion engine as described in claim 25 wherein the air/fuel mixture is compressed by external means from ambient atmospheric pressure to up to approximately ten (10) times ambient atmospheric pressure before being injected into said variable volume combustion chamber.

28. An improved internal combustion engine as described in claim 27 in which the pressure in said variable volume combustion, after combustion of said air/fuel mixture, chamber is approximately equal to the pressure in the power piston chamber as the power piston in said power piston chamber reaches top dead center and said communicating valve begins to open.

29. An improved internal combustion engine as described in claim 25 in which the combustion air is compressed external to the variable volume combustion chamber, but fuel is injected into said variable volume combustion chamber prior to ignition.

30. An improved internal combustion engine as described in claim 29 in which the pressure in said variable volume combustion chamber, after combustion of said air/fuel mixture, is approximately equal to the pressure in the power piston chamber as the power piston in said power piston chamber reaches top dead center and said communicating valve begins to open.

31. An improved internal combustion engine as described in claim 19 wherein said power piston is further comprised of a protrusion which is configured to nearly fill the communicating valve port between said variable volume combustion chamber and said power piston chamber when said power piston is in the top dead center position.

32. An improved internal combustion engine as described in claim 31 wherein the air/fuel mixture is compressed by external means from ambient atmospheric pressure to up to approximately ten (10) times ambient atmospheric pressure before being injected into said variable volume combustion chamber.

33. An improved internal combustion engine as described in claim 31 in which the pressure in said variable volume combustion chamber, after combustion of said air/fuel mixture, is approximately equal to the pressure in the power piston chamber as the power piston in said power piston chamber reaches top dead center and said communicating valve begins to open.

34. An improved internal combustion engine as described in claim 31 in which the pressure in said variable volume combustion chamber, after combustion of said air/fuel mixture, is approximately equal to the pressure in the power piston chamber as the power piston in said power piston chamber reaches top dead center and said communicating valve begins to open.

35. An improved internal combustion engine as described in claim 31 in which the combustion air is compressed external to the variable volume combustion chamber, but fuel is injected into said variable volume combustion chamber prior to ignition.

36. An improved internal combustion engine as described in claim 35 in which the pressure in said variable volume combustion chamber, after combustion of said air/fuel mixture, is approximately equal to the pressure in the power piston chamber as the power piston in said power piston chamber reaches top dead center and said communicating valve begins to open.

37. An improved internal combustion engine as described in claim 19 wherein said air/fuel mixture is ignited in said variable volume combustion chamber by further compressing said air/fuel mixture caused by further reducing the volume of said variable volume combustion chamber to initiate ignition as is typical for diesel engines.

38. An improved internal combustion engine as described in claim 37 wherein the air fuel mixture is compressed by external means from ambient atmospheric pressure to up to approximately ten (10) times ambient atmospheric pressure before being injected into said combustion chamber.

39. An improved internal combustion engine as described in claim 37 in which the pressure in said variable volume combustion chamber, after combustion of said air/fuel mixture, is approximately equal to the pressure in the power piston chamber as the piston in said power piston chamber reaches top dead center and said communicating valve begins to open.

40. An improved internal combustion engine as described in claim 37 in which the combustion air is compressed external to said variable volume combustion chamber but fuel is injected into said variable volume combustion chamber prior to ignition.

41. An improved internal combustion engine as described in claim 40 in which the pressure in said variable volume combustion chamber, after combustion of said air/fuel mixture, is approximately equal to the pressure in the power piston chamber as the power piston in said power piston chamber reaches top dead center and said communicating valve begins to open.

42. An improved internal combustion engine as described in claim 40 in which the pressure in said variable volume combustion chamber, after combustion of said air/fuel mixture, is approximately equal to the pressure in the power piston chamber as the power piston in said power piston chamber reaches top dead center and said communicating valve begins to open.

* * * * *

UNITED STATES PATENT AND TRADEMARK OFFICE
CERTIFICATE OF CORRECTION

Figure 5A:
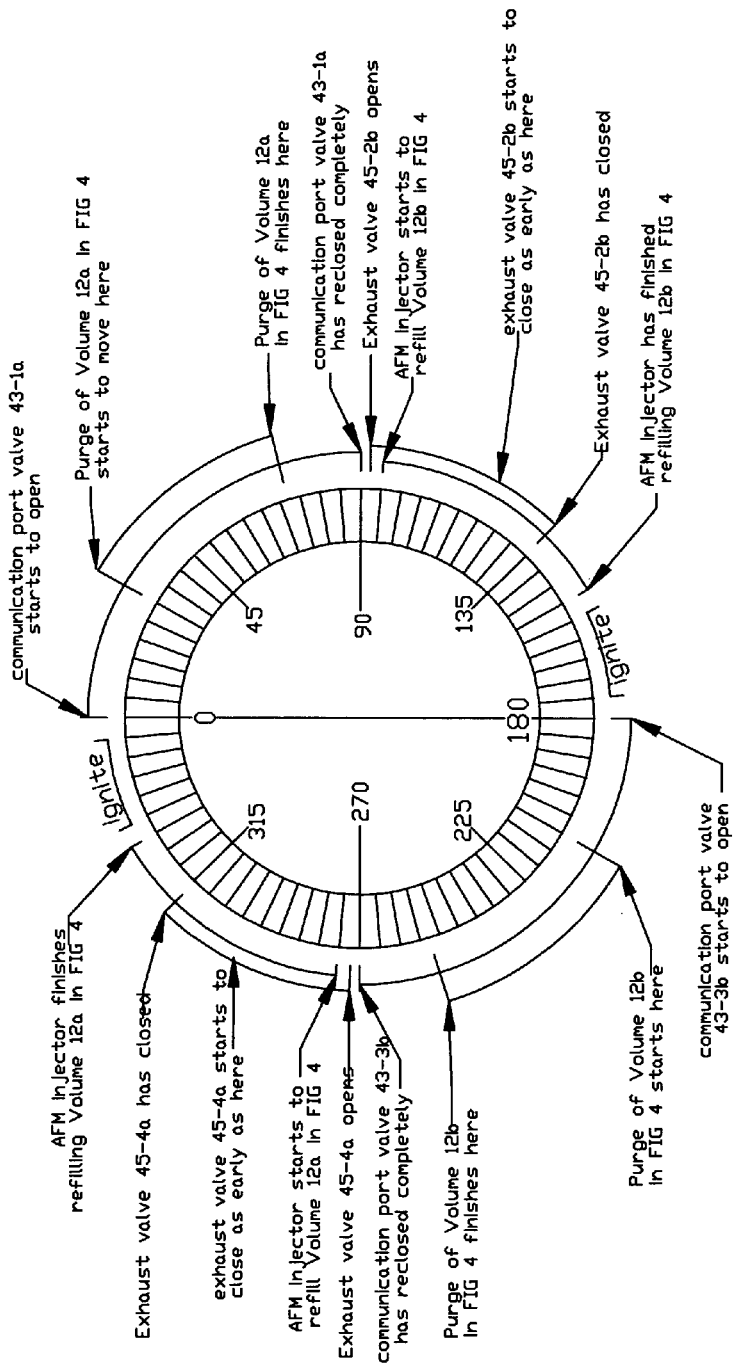
FIG. 5a is representation of surface 48.

PATENT NO. : 8,205,593 B2  Page 1 of 1
APPLICATION NO. : 12/456490
DATED : June 26, 2012
INVENTOR(S) : William I. de Versterre It is certified that error appears in the above-identified patent and that said Letters Patent is hereby corrected as shown below:

Column 15, line 6 should read:
Fig. 5a shows the relative timing sequence of one surface Signed and Sealed this
Twenty-eighth Day of August, 2012

David J. Kappos
*Director of the United States Patent and Trademark Office*